United States Patent [19]

Mazza

[11] 3,752,907

[45] Aug. 14, 1973

[54] METHOD AND APPARATUS FOR TRANSFERRING COMMANDS FROM THE CONTROL SITE TO THE RECORDING SITE IN CLOSED LOOP TELEVISION INSTALLATIONS

[75] Inventor: Lamberto Mazza, Pordenone, Italy

[73] Assignee: Industrie A. Zanussi S.p.A., Pordenone, Italy

[22] Filed: Mar. 19, 1971

[21] Appl. No.: 126,160

[52] U.S. Cl. .......................... 178/5.6, 178/DIG. 23
[51] Int. Cl. .......................................... H04n 1/32
[58] Field of Search ...................... 178/5.6, DIG. 23

[56] References Cited

UNITED STATES PATENTS

| | | | |
|---|---|---|---|
| 3,441,665 | 4/1969 | Wuensch | 178/69.5 F |
| 3,534,160 | 10/1970 | Lowenstein | 178/5.4 R |
| 2,978,538 | 4/1961 | Breese | 178/5.6 |

*Primary Examiner*—Robert L. Griffin
*Assistant Examiner*—George G. Stellar
*Attorney*—Holman & Stern

[57] ABSTRACT

A method and an apparatus for transferring commands from the control site of a closed loop TV circuit to the recording site, said method essentially consisting in the steps of selecting a predetermined number of line-synchronizing pulses from the video signal for each command starting from the control site, the pulses so selected being impressed to the recording site and counted the counted number being converted into a signal whose magnitude and destination are a function of said counted number. The advantage of the invention is that additional command-transferring lines can be actually dispsned with, the usual coaxial cables being generally sufficient to the above specified purpose.

21 Claims, 7 Drawing Figures

United States Patent [19]
Mazza
[11] 3,752,907
[45] Aug. 14, 1973
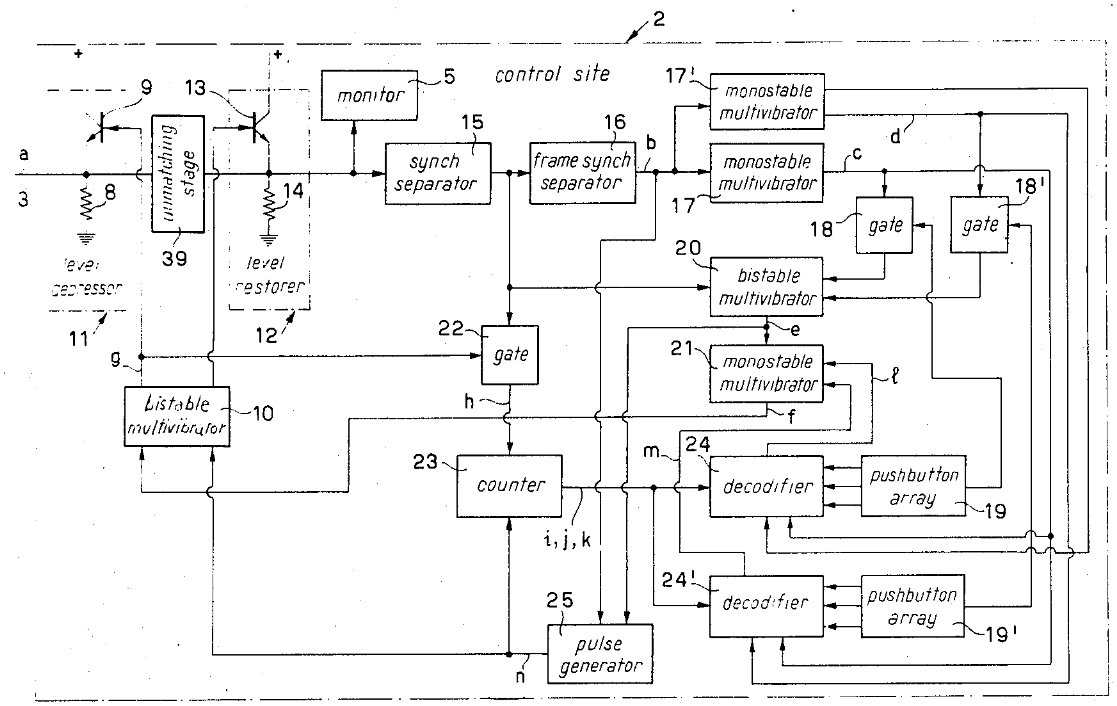

Patented Aug. 14, 1973 3,752,907

7 Sheets-Sheet 2

Patented Aug. 14, 1973 3,752,907

7 Sheets-Sheet 3

Patented Aug. 14, 1973 3,752,907

7 Sheets-Sheet 7

METHOD AND APPARATUS FOR TRANSFERRING COMMANDS FROM THE CONTROL SITE TO THE RECORDING SITE IN CLOSED LOOP TELEVISION INSTALLATIONS

BACKGROUND OF THE INVENTION

1. Field of the Invention

The present invention relates to a method and an apparatus for transferring commands from the control site to the recording site in closed loop television installations.

2. Description of Prior Art

As is known, in the closed loop television installations, there is the necessity of transferring, from the control site to the recording site (that is, the TV-cameras) a certain number of commands, such as those for the vertical and horizontal shift of the TV-camera and those relative to the three variable components of the objective, that is, focal length, stop and dollying-in.

One of the problems connected with the transfer of such commands is that of the transfer means, which consists, at present, of a plurality of leads, one for each command to be transferred, which run parallely of the coaxial cable which carries the video signal and form therewith an expensive multiple cable, which is cumbersome and difficult to lay in, especially if the distance between the control site and the recording site is such as to require junctions between a cable section and another. Moreover, since shields for the control lines are usually not provided, interference and noise may occur, which are detrimental to the accuracy of the transferred commands.

Another problem is the necessity of synchronizing the commands with the taking phase of the camera, can be obtained only when the commands are transferred in code, either in series or in parallel.

SUMMARY OF THE INVENTION

A principal object of the present invention is thus considerably to reduce the number of lines added to a coaxial cable of the video signal for transferring commands from the control site to the recording site.

An additional object is totally to dispense with said additional lines and to utilize the video signal coaxial cable itself for transferring the commands from the control site to the recording site, so as to obviate all the drawbacks enumerated above, which are associate with the use of a multiple cable.

A third object of the present invention is, to simplify and to automatize the synchronization between the taking phase of the TV-camera and the commands transferred thereto from the control site.

At least the first and the third objects of the invention are achieved by a method, which is characterized in that it comprises, for each command as imparted at the control site, the steps of selecting a predetermined number of line-synchronizing pulses from the video signal transferred from the taking site to the control site, the communication of the selected pulses to the recording site, and, in correspondence with the recording site, the counting up of the selected pulses and the conversion of the counted number into a signal whose value and destination are a function of the counted number.

The device using such a method is characterized, in turn, in that it comprises means for selecting from the video signal, a preselected number of line synchronizing pulses, means for communicating to the recording site the selected pulses and, in correspondence with the recording site, means for counting said selected pulses and means for converting the counted number into a signal whose magnitude and destination are a function of said counted number.

It is apparent that, with such a method and such an apparatus, the video signal itself is exploited for generating and transferring control signals, which, by being staggered in time and distinguishable over each other as a function of the line synchronization pulses forming each signal, they can be transferred from the control site to the recording site by resorting to a single line in addition to the coaxial cable which carries the video signal. The multiple cable as used in prior art practice nowadays is thus reduced to a cable which merely comprises the coaxial cable for the video signal and a single line which carries the commands for the TV-camera and, consequently, the cost, the bulk the cable-laying difficulties and the possibility of introducing noise and interference are reduced.

Still more significant advantages are obtained with a preferred embodiment of both the method and the device according to the invention, which permits rapidly to obtain the second of the objects of the invention as enumerated above, that is, the suppression also of the last line left in the multiple cable additional to the coaxial cable for the video signal and the utilization of the coaxial cable per se for transferring the commands from the control site to the recording site.

Such a preferred embodiment of the method according to the invention is characterized in that the selection of a predetermined number of line synchronization pulses and the communication of the selected pulses to the recording site are effected by lowering the level by a portion of a predetermined duration of the video signal, starting from the control site and all along the cable which carries the video signal from the recording site to the control site and detecting, in correspondence with the recording site, the line synchronization pulses which are comprised in the depressed-level portion.

Similarly, the device which allows practice of the preferred embodiment of the method according to the invention is characterized in that it comprises, in correspondence with the control site, means for depressing the level of a portion of the video signal, means for detecting the line synchronization pulses which are comprised in said depressed-level portion, means for counting the detected pulses and means for converting the counted number into a signal whose magnitude and destination are a function of said counted number.

In this manner, the video signal per se, with its level drops, communicates to the recording site the commands impressed by the control site and thus they do not require any other lines in addition to the cable which carries the video signal. By so doing, a considerable reduction of cost, saving in bulk and cable-laying difficulties is achieved, and, moreover, the noise caused by the lack of shielding of the lines for the transfer of commands are definitely dispensed with.

BRIEF DESCRIPTION OF THE DRAWINGS

The features and advantages of the present invention will be better understood from the ensuing detailed description of two different embodiments of the device according to the invention. In the detailed description, which is given by way of example only, without any limitation, reference will be had to the accompanying drawings, wherein.

DESCRIPTION OF PREFERRED EMBODIMENTS

Figure 1A:
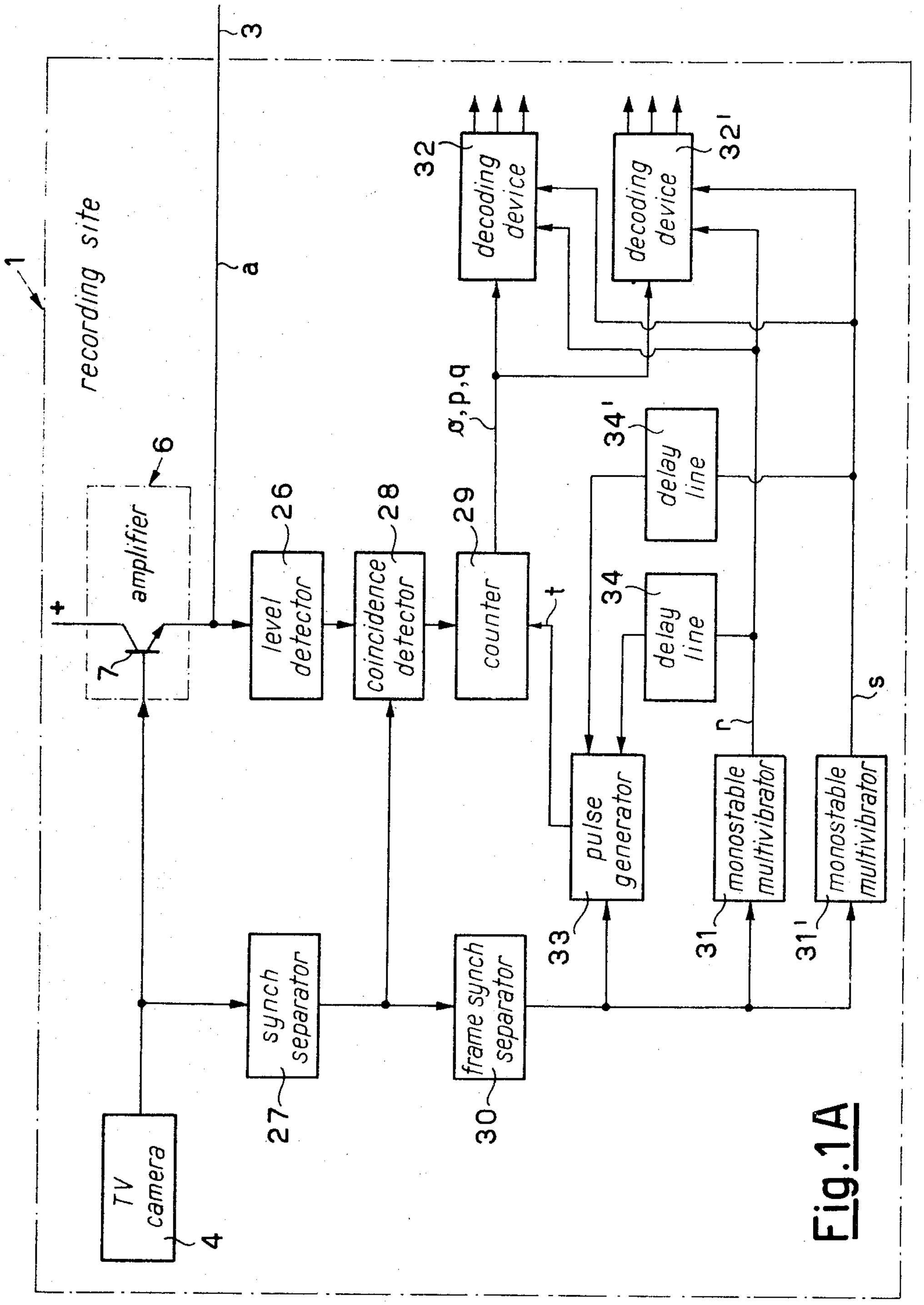
FIGS. 1A and 1B, which FIGS. are to be read together and considered hereinafter as FIG. 1, is a block diagram of a device according to this invention, in which the selection of predetermined numbers, which can be varied from time to time, of line synchronizing pulses from the video signal transferred from the recording site to the control site, and their communication to the recording site, are effected by depressing the level of portions of the video signal which have a predetermined duration and by detecting, in correspondence with the recording site, the line synchronizing pulses comprised in each of said depressed-level portions.
Figure 1B:
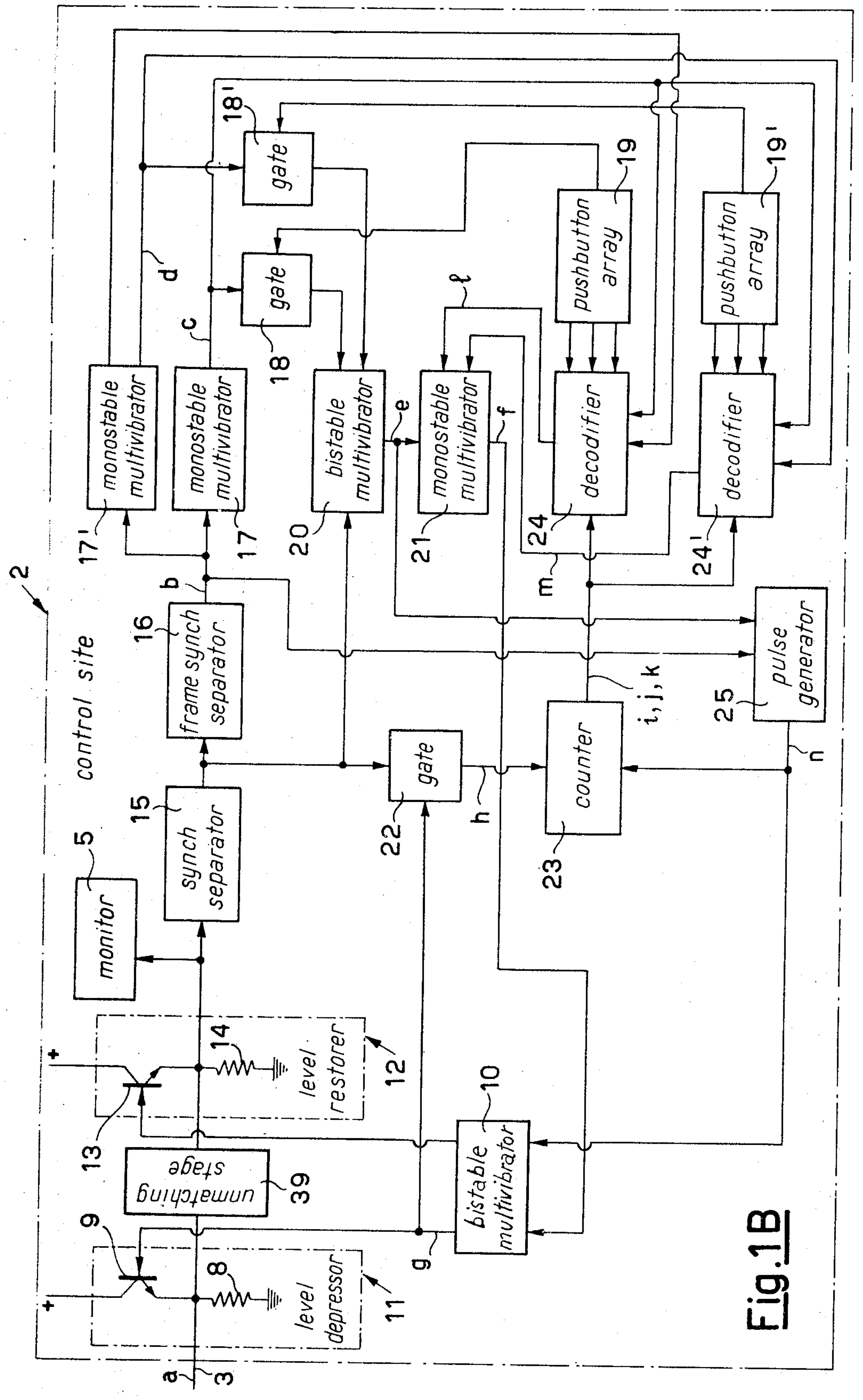

The device as shown in FIG. 1 is essentially divided into two parts, 1 and 2, which are interconnected by a cable 3. The portion 1 is located in correspondence with the recording site and comprises the TV-camera 4, whereas the portion 2 is situated in correspondence with the control site and comprises the monitor 5.

The output of the TV-camera 4 is received and transferred by an amplifier 6, comprising an NPN-transistor 7 having its base connected to the output of the TV-camera, the collector connected to a positive source and the emitter connected to a terminal of the cable 3. The other terminal of the cable 3, in turn, is connected to ground through a resistor 8 which is the characteristic impedance of the cable, and is connected, moreover, to the emitter of an NPN transistor 9 having its collector connected to a positive source and its base connected to the output of a bistable multivibrator 10. The assembly consisting of the transistor 9 and the resistor 8 makes up a level-depressor 11 which is followed by an unmatching stage 39 and a level-restorer 12, of equal value, formed by an NPN transistor 13 equal to the transistor 9 and having its emitter connected to the emitter of the transistor 9 (through the abovementioned unmatching stage) and moreover connected to ground through a resistor 14 having the same value as the resistor 8, the collector connected to a positive source having the same value as that of the transistor 13 and the base connected to the other output of the bistable multivibrator 10.

The output of the level restorer 12, which is in practice the video signal itself as generated by the TV-camera 4, feeds the monitor 5 and also a synchronism separator 15, which is followed by a frame synchronism separator or integrating amplifier 16, which, at every interval between any half-frame and another of the video signal, emits an elongate pulse which begins with the first, and ends with the last of the frame synchronism pulses as contained in said interval.

The separator 16 is followed by two monostable multivibrators 17 and 17′ which are shifted from their stable states by the end of each of said elongate pulses emerging from the integrator 16 during periods of time which are determined by the respective oscillation constants. One of such oscillation constants is such as to terminate the oscillation of the attendant multivibrator (for example, multivibrator 17) beyond the time interval as provided for the post-equalization pulses (160 microseconds) whereas the other is considerably higher.

The outputs of the two monostable multivibrators 17 and 17′ are connected, through gates 18 and 18′, as controlled by respective pushbuttons arrays 19 and 19′ (better illustrated hereinafter) to the input of a bistable multivibrator 20 which is controlled by the termination of each of the pulses of different durations, as emitted by the monostable multivibrators 17 and 17′ so as to leave a stable state to which it had been restored by the beginning of the first line synchronizing pulse as sent thereto by the separator 15 after the latter is removed from its own stable state. Such a bistable multivibrator could also be replaced by a monostable multivibrator which is controlled in the same way, provided, however, that the oscillation constant of the monostable multivibrator is at least equal to the distance between two consecutive line synchronizing pulses (64 microseconds).

The pulses, as delivered by the multivibrator 20 (two for each half-frame period in the case of FIG. 1, one in the case of suppression of one of the monostable multivibrators 17 and 17′, three in the case of the addition of a further monostable multivibrator in parallel with the first two, and so on), drive an additional monostable multivibrator 21, which, at the termination of each of said pulses leaves its own stable state to revert thereto after a time which is fixed by its constant of oscillation so as to exceed the duration of a line synchronization pulse (4 microseconds) but to be lower than the distance between two consecutive of such pulses (64 microseconds). Such a delimitation of the oscillation time of the monostable multivibrator 21 acts in such a way that the return thereof to its own stable state takes place always within an interval between a line synchronization pulse and the subsequent one (the reason therefor will become apparent hereinafter).

To the output of the monostable multivibrator 21 there is connected the input of the bistable multivibrator 10, which is driven so as to switch from a stable state to the other, every time that the monostable multivibrator 21 is reverted to its stable state. The bistable multivibrator 10 is connected to the transistors 9 and 13 and a gate 22 inserted between the synchronism separator 15 and a digital counter 23 so that each stable state of the multivibrator corresponds to the conductive condition of the transistor 9 (feeding the base thereof with current), the cutoff of the transistor 13 (no current to the base) and the closure (cutoff) of the gate 22, and so that its second stable state corresponds to the contrary conditions. The counter 23 (consisting of two or more interconnected bistable multivibrators) gives an indication of its state of count having two decodifiers 24 and 24', each of which, when it is enabled by the combination of the states of the monostable multivibrators 17 and 17', compares the number counted by means of the counter 23 with the number set by the respective pushbutton array 19 or 19' and, when the two numbers coincide, delivers a pulse which drives the monostable multivibrator 21 to effect an oscillation such as those imposed to it by the bistable multivibrator 20 and thus to command a switching of the bistable multivibrator 10.

The portion 2 of the device of FIG. 1 eventually comprises a pulse generator 25 which is driven, by the end of each elongate pulse delivered by the separator 16 and by each shift of the bistable multivibrator 20 from its stable state, to generate a resetting pulse for the counter 23 and a pulse for restoring the bistable multivibrator 10 to its stable state as hereinbefore defined.

The portion 1 of the device shown in FIG. 1 comprises, in turn, a level detector 26 which is adapted to deliver a pulse every time that the video signal transferred along the cable 3 goes below a predetermined level (that which occurs at every actuation of the level depressor 11, that is, every time that the transistor 9 is cut off, as will appear more clearly hereinafter), a synchronism separator 27 connected to the output of the TV-camera 4, a coincidence detector 28 adapted to deliver a pulse every time that a coincidence appears between a pulse delivered by the level detector 26 and a pulse delivered by the synchronism separator 27, a digital counter 29 (formed by the same number of bistable multivibrators as the counter 23), a frame synchronism separator or amplifying integrator 30 adapted to deliver elongate pulses which begin at the first and are terminated at the last of the frame synchronism pulses which the separator 27 allows to pass, two monostable multivibrators 31 and 31', which are driven by the end of each pulse delivered by the separator 30 to leave the respective stable states during times which are determined by the respective oscillation constants (the first shorter than the period of instability of the monostable mlutivibrator 17, multivibrator second shorter than the period of instability of the monostable multivibrator 17'), two decoding devices 32 and 32' which are enabled by the monostable multivibrators 31 and 31' alternatingly as a function of their states and which are preset so as to deliver, as they are enabled, output signals (and control signals for utilizing devices connected thereto) whose magnitudes and destinations are a function of the state of count of the counter 29 and, lastly, a pulse generator 33 which is driven by the pulses sent thereto by the frame synchronism separator 30 and, through respective delay lines 34 and 34', by the monostable multivibrators 31 and 31', to cause the resetting of the counter 29.

To explain the general operation of the device shown in FIG. 1, let it be assumed that the stable states of the multivibrators 17–17', 21 and 31–31', are those which correspond to output logical levels "1," that the at rest states of the frame synchronism separators 16 and 30 and of the pulse generators 25 and 33 are those which correspond to output logical levels "1," that the at rest or reset states of the counters 23 and 29 are those which correspond to output logical levels "0" for all the bistable multivibrators which make up the counters, that the at rest state of the bistable multivibrator 20 is that corresponding to an output logical level "1" and that the at rest state of the bistable multivibrator 10 is the one which coresponds to the cutoff of the transistor 13 and the gate 22 and the conduction of the transistor 9.

Under these circumstances, the potential of the video signal delivered by the recording site to the control site along the cable 3 equals the product of the ohmic value of the resistor 8 by the sum of the emitter currents of the transistors 7 and 9, the former current having a value which is varied as a function of the level of the video signal as delivered by the TV-camera 4 and the latter having a constant value.

The video signal emerging from the cable 3 is sent to the monitor 5, which renders it visible, and to the separator 15, which removes therefrom the line synchronizing pulses 35, the frame synchronizing pulses 36 and the pre- and post-equalization pulses 37 and 38 and sends them to the separator 16, the bistable multivibrator 20 and the gate (closed) 22. The group of frame synchronizing pulses contained in each interval between one half-frame and the other of the video signal drives the separator or integrator 16 to deliver a negative pulse (with respect to the logical level "1" which corresponds to the at rest condition of the separator 16) which is started with the first and is terminated with the last of said frame synchronizing pulses (plot *b*, FIG. 2). The end of said negative pulse drives the generator 25 to deliver a reset control pulse for the counter 23 and the bistable multivibrator 10 and, in addition, it drives the monostable multivibrators 17 and 17' to an unstable state (logical level "0") where they remain during different times which are determined by the respective constants of oscillation (plots *c* and *d*, FIG. 2). Assuming that the two pushbutton arrays 19 and 19' have been preset so as to keep the gates 18 and 18 open (conductive state), and it will be seen hereinafter in which way this occurs, the return to the stable state of the monostable multivibrator which possesses the least constant of oscillation (17, in the example shown) causes the switching of the bistable multivibrator 20 to its stable state, to which an output level of "0" corresponds (plot *e*, FIG. 2). Such a stable state of the bistable multivibrator 20 remains until the arrival of the first of the line synchronizing pulses sent thereto by the separator 15 (as has been outlined above, the constant of oscillation of the monostable multivibrator 17 is such as to put an end to the period of instability of the monostable multivibrator in question only after the termination of the post-equalization pulses 38); after which the return of the bistable multivibrator 20 to its initial stable state causes the momentary removal of the monostable multivibrator 21 from its own stable state (plot *f*, FIG. 2). The return of the latter to its own stable state, which, as has been outlined above, takes place after a time which is shorter than the distance between two consecutive line synchronizing pulses, causes the switching of the bistable multivibrator 10 (plot *g*, FIG. 2) towards its stable state, to which corresponds the cutoff of the transistor 9, the conduction of the transistor 13 and the opening (conduction) of the gate 22.

The cutoff of the transistor 9, as it annuls the relevant emitter current, causes the lowering of the potential of the video signal flowing through the cable 3 (plot *a*, FIG. 2), a lowering which, with respect to the monitor 5, is compensated by a corresponding rise in the potential as caused by the conduction of the transistor 13. The presence of the unmatching stage 39 causes however that, along the cable 3, and more particularly in correspondence with the input end thereof, only the lowering is felt, so that the level detector 26 feels the line synchronizing pulses whose level has been lowered and delivers, in turn, corresponding pulses which, as the coincidence is ascertained with the line synchronizing pulses sent to the coincidence detector 28 by the synchronism separator 27, are allowed to pass on to the digital counter 29 which thus starts counting (starting from a reset conditions to which it had been previously driven by the pulse generator 33 which was actuated by the frame synchronism separator 30). The presence of the coincidence detector 28 prevents the counter 29 from counting also possible noises comprises between two consecutive line synchronizing pulses.

Figure 2:
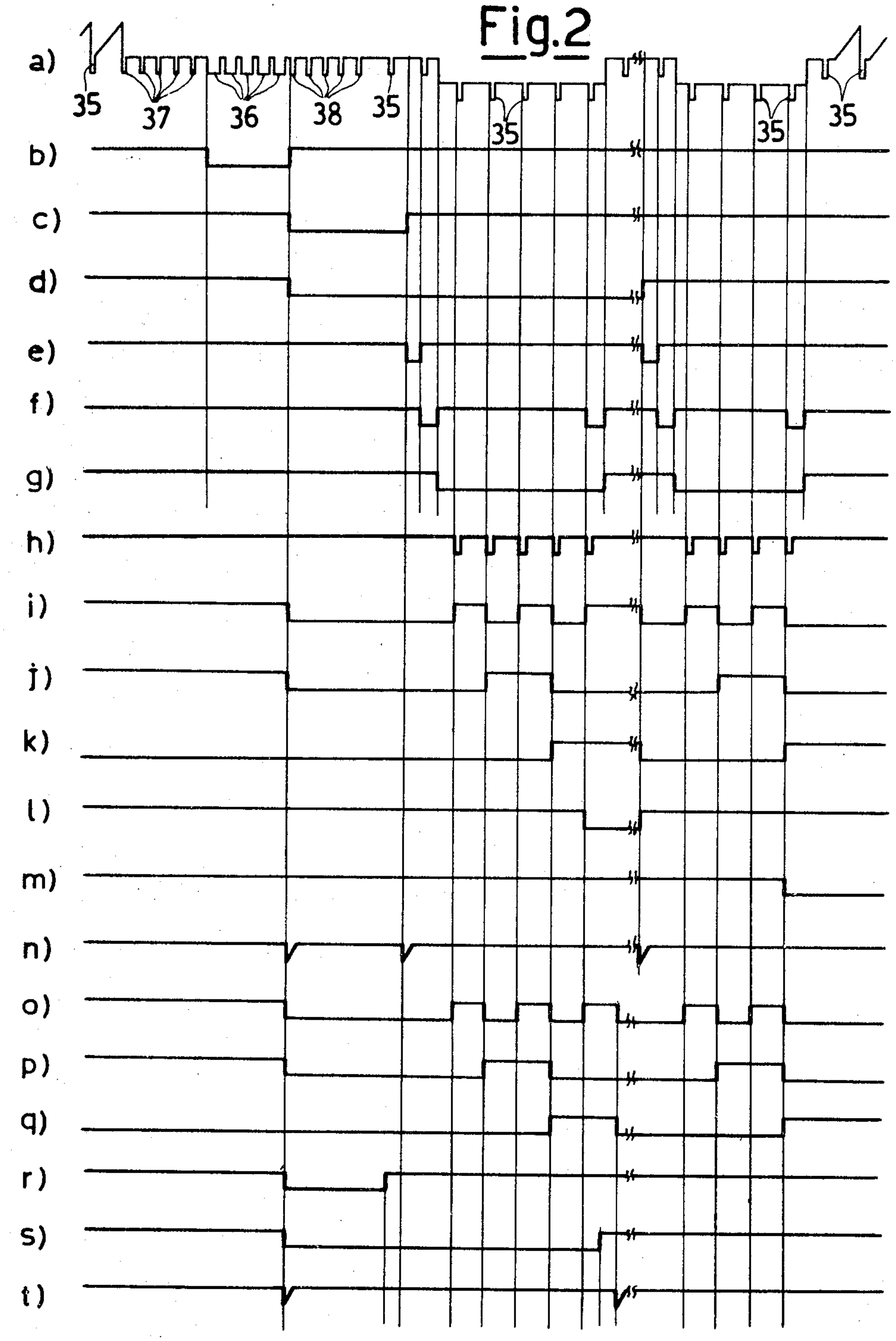
FIG. 2 shows, in the form of superposedly arranged plots, the variations of the logical levels of the several component parts comprised in the device of FIG. 1.

Meanwhile, the opening of the gate 22 has caused line synchronizing pulses to be sent to counter 23 (plot *h*, FIG. 2), which, (starting from a reset condition to which it has been previously driven by the pulse generator 25 as actuated by the bistable multivibrator 20, (plot *n*, FIG. 2), starts a count, an indication of which is given to the decoding devices 24 and 24' (in the plots *i*, *j*, *k* of FIG. 2 and the ensuing description it has been assumed that the counter 23 comprises three mutually interconnected multivibrators).

Figure 3:
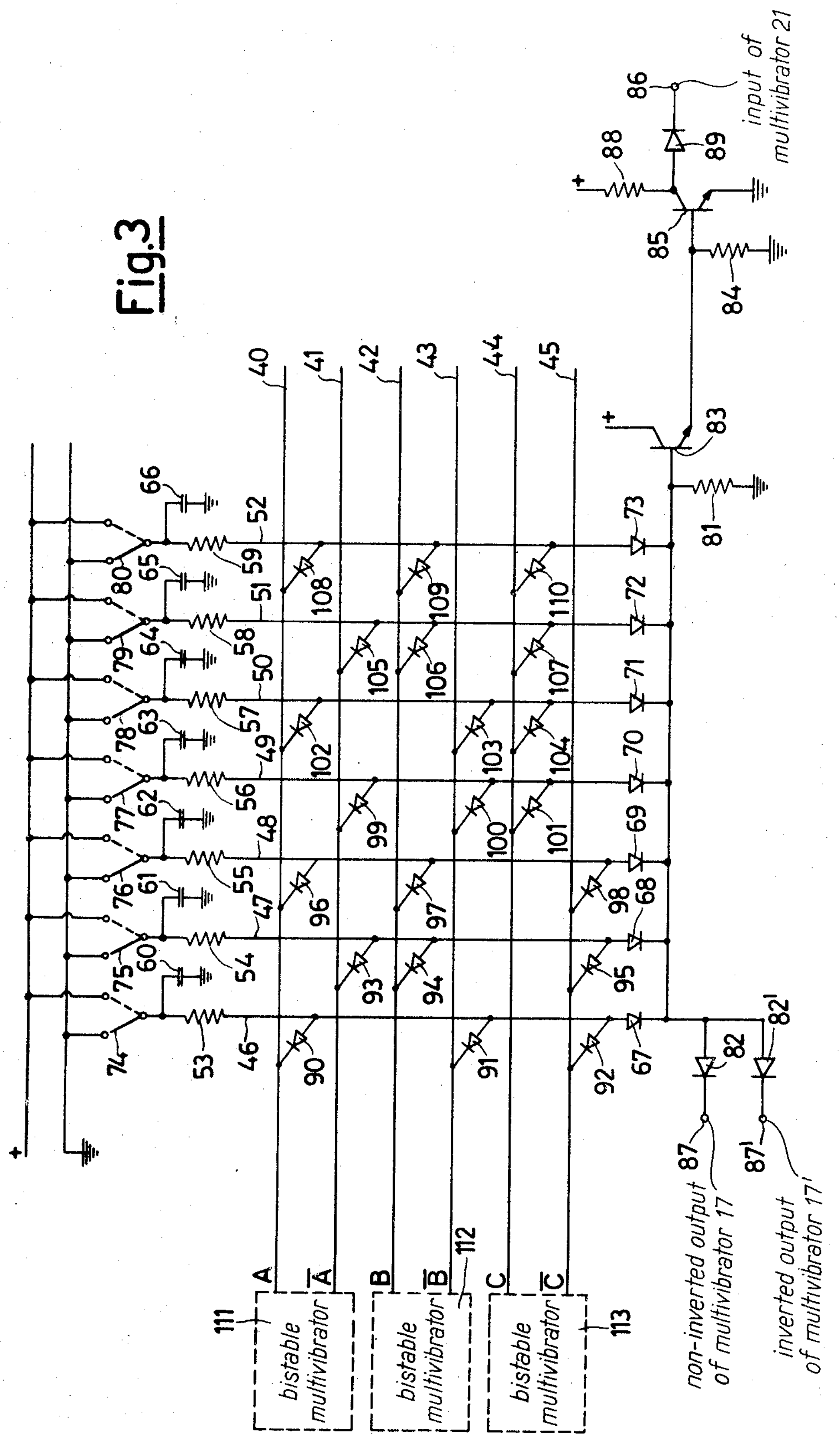
FIG. 3 shows the circuitry diagram of an exemplary embodiment of one of the decoding devices inserted in the portion of the device which is situated in correspondence with the control site in order to determine, as a function of the command to be transferred, the duration of each level depression.

To understand the operation of the decoding circuits 24 and 24', one must consider the particular embodiment of the decoding circuit 24 which is shown in FIG. 3. The example shown comprises six horizontal lines 40–45 which are connected to respective noninverted and inverted outputs A—$\overline{A}$, B—$\overline{B}$, C—$\overline{C}$ of the three bistable multivibrators (111, 112, 113) which make up the counter 23 (obviously, the lines will be increased in number by two at a time as the number of bistable multivibrators comprised in the counter 23 is increased) and seven vertical lines 46–52 which comprise respective resistors 53–59 (with the respective capacitors 60–66 for connection in parallel to the ground) and the respective diodes 67–73, and alternatingly connect with a positive source or the ground, as a function of the state of the respective switches 74–80, the base (grounded through a resistor 81 and connected in addition to the non-inverted output 87 of the monostable multivibrator 17 and to the inverted output 87 of the monostable multivibrator 17' through the respective diodes 82 and 82 ) of an NPN transistor 83 having its collector connected to a positive source and the emitter connected to the ground through a resistor 84 and connected, moreover, to the base of an NPN transistor 85 having its own emitter grounded and the collector connected to a positive source through a resistor 88 and connected, furthermore, through a diode 89, to a terminal 86 which is connected, in turn, to the input of the monostable multivibrator 21. The interconnection between the lines 40–45 and the lines 46–52 is obtained by means of a group of diodes 90–110 which are so distributed as to have, at every state of count of the counter 23, a different situation of the lines 46–52 with respect to the lines 40–45. To the switches 74–80 are respectively associated as many switches (not shown), each of which is capable, as it is shifted from a position corresponding to that of FIG. 3 for the switches 74–80, of causing the gate 18 to open. The switches 74–80 and the associated switches for opening the gate 18 form the pushbutton array 19 of FIG. 1.

The decoding circuit 24' can be considered as being substantially similar to that of FIG. 3, the only difference being that in this case a diode such as 82' of FIG. 3 connects it with the non-inverted output of the monostable multivibrator 17'.

Due to the effect of the structure as described above the result is that, if all the switches 74–80 of the decoding circuit 24 are maintained in the "at rest" position of FIG. 3, the gate 18 is closed (cutoff) and the transistor 83 is maintained at cutoff and thus maintains at "1" the logical level of the signal at the output terminal 86.

If, conversely, one of the switches 74–80, for example switch 78, is shifted towards the other of the positions it can take, the gate 18 is open (it conducts) and in addition the line which contains the shifted switch (the line 50 in the example shown), is so preset that, upon the return of the monostable multivibrator 17 to the stable state which had previously been abandoned under the drive of the separator 16, the occurrence of the condition which provides the logical level "1" simultaneously for the noninverted outputs A and C of the bistable multivibrators 111 and 113 and for the inverted output $\overline{B}$ of the bistable multivibrator 112, that is, the counting, by the agency of the counter 23, of the fifth line synchronizing pulse as sent thereto by the separator 15 through the gate 22, causes the transistor 83 to conduct and consequently also the transistor 85 becomes conductive and so the logical level of the signal at the output terminal 86 drops to "0" (Plot 1, FIG. 2). This drop thus takes place after a period of time which is determined by the shifting out of the switches 74–80 of the decoding circuit 24'.

Such a drop of the logical level causes a new oscillation of the monostable multivibrator 21 (plot *f*, FIG. 2) and thus (plot *g*, FIG. 2) the return of the bistable multivibrator 10 to its own first stable state, that is, to the stable state corresponding to the conduction of the transistor 9, the cutoff of the transistor 13 and the closing (cutoff) of the gate 22. Then, while the counter 23 is stopped at the state of count which has just been taken (five pulses in the example shown), the potential of the video signal transferred along the cable 3 is raised so that the level detector 26 stops to emit pulses and the counter 29 is also latched to the state of count it has just taken (five pulses in the example shown). The number counted by the counter 29 (which is given, also in this case, by a combination of the states of three bistable multivibrators 114, 115 and 116, plots *o*, *p*, *q*, FIG. 2) is converted by the decoding circuit 32 (enabled by the combination of the states of the monostable multivibrators 31 and 31' before the start of the counting by the counter 29) into a control signal whose magnitude and destination are a function of said counted number.

Figure 4:
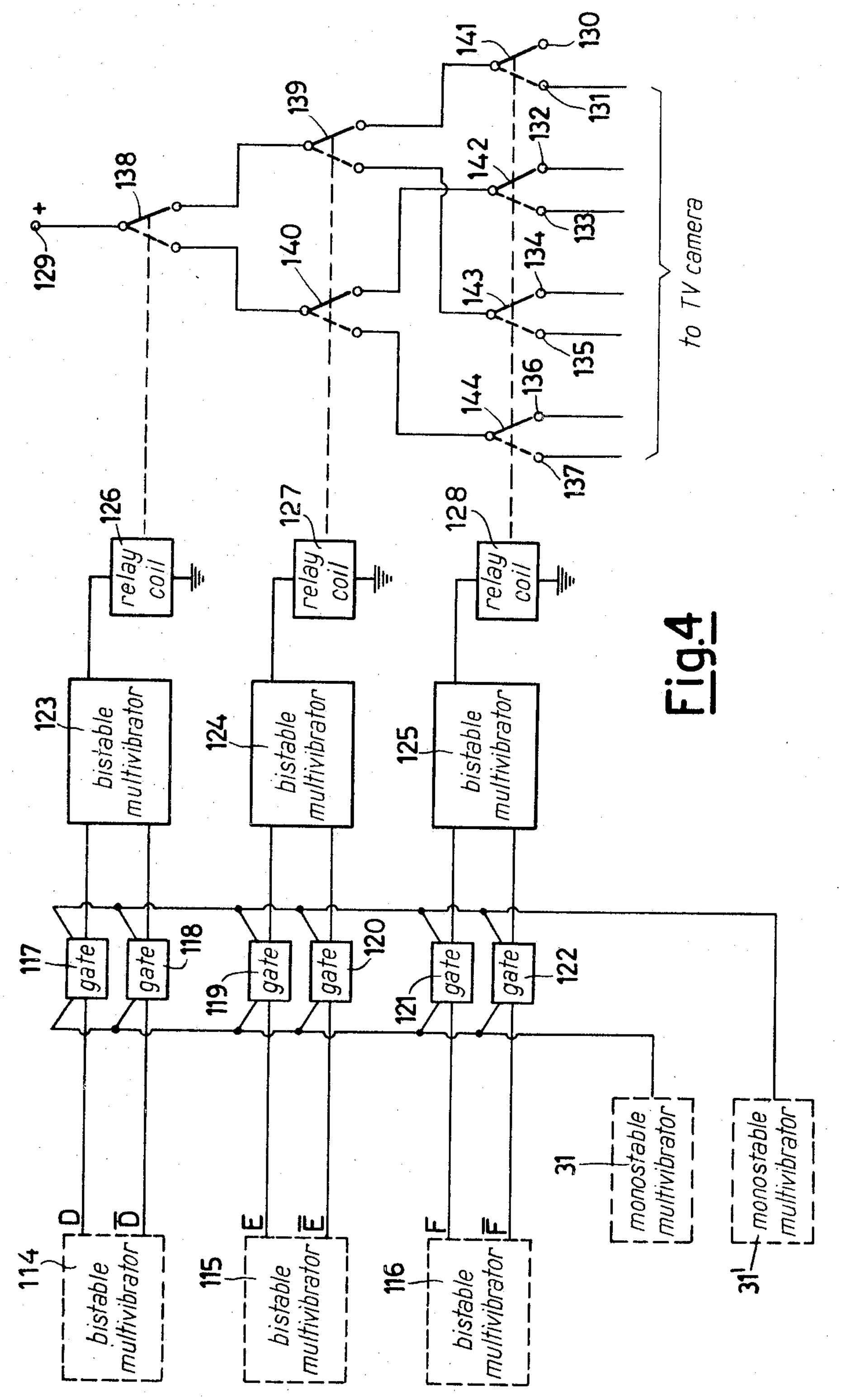
FIG. 4 shows the circuitry diagram of an exemplary embodiment of one of the decodification devices located in correspondence with the recording site in order to effect the conversion of each counted number into a command signal whose magnitude and destination are a function of said counted number.

The mode of operation of the decoding circuit 32 (and also of the decoding circuit 32') will be better understood by observing the embodiment of FIG. 4, which relates to the decoding circuit 32 itself. This decoding circuit comprises three groups of gates 117–118, 119–120 and 121–122 which, under the action of the monostable multivibrators 31 and 31' (the gates are open when the monostable multivibrator 31, plot *r*, FIG. 2, is at the logical level "1" and the monostable multivibrator 31', plot *s* FIG. 2, is at the logical level "0" and are closed in all the other cases) connect the non-inverted outputs and the inverted ones, D–$\overline{D}$, E–$\overline{E}$ and F–$\overline{F}$ of the three bistable multivibrators (114, 115 and 116) of the counter 29 to corresponding "set" and "reset" inputs of three bistable multivibrators 123, 124 and 125, between whose "set" outputs and the ground three relay coils 126, 127 and 128 are inserted, which control seven switches 138–144 which are adapted variously to connect a feed terminal 129 with an open terminal 130, or with either of seven terminals 131–137 which are connected to as many utilizing devices (for example the motors which control the horizontal and the vertical shifts of the TV-camera, the focussing motor and so forth). The structure of the decoding circuitry 32' can be considered as being very much the same as illustrated in FIG. 4.

An effect of the structure as described above is that, after the opening of the gates 117–122, the bistable multivibrators 123–125 are brought into the same conditions as the bistable multivibrators 114–116 contained within the counter 29 and thus they cause the shifting of the switches 138–144 towards a condition which reproduces the number as counted by the counter 29 itself. For example, assuming that the condition of FIG. 4 is the at rest condition corresponding to the logical levels "0" for the non-inverted outputs of all the bistable multivibrators 114–116 the result is that, to the number "5" as counted by the counter 29 during the period in which the level of the video signal is lowered (whose duration is determined by the one switch which has been shifted in the decoding circuit 24), there corresponds the energization of the relays 126 and 128 and thus, by virtue of the shift of the switches 138 and 141–144, a connection between the feeding terminal 129 and the output terminal 133 (and thus, for example, the actuation in the clockwise direction of the motor which controls the horizontal displacements of the TV-camera). If, conversely, the switch shifted in the decoding circuit 24 had been switch 79, the counter 29 would have counted six pulses and thus a connection would have been established between the feeding terminal 129 and the output terminal 135, and so forth. The destination (and, according to the nature of the connections, the magnitude) of the control signals sent to the utilizing apparatus is thus a function of the number counted by the counter 29, and thus of the duration of the period during which the level of the video signal is lowered and thus, in summation, of the one of the switches of the decoding circuit 24 which has been shifted from its "at rest" position. Thus, to every command impressed in the control site by means of the switches contained in the decoding circuit 24, there corresponds a precisely defined and unique command impressed to the utilizing apparatus located in the recording site. The transfer of the command from the control site to the recording site is carried out with the aid of the same video signal which is carried by the cable 3 so that no additional lines are required in the cable 3 aforementioned. On the other hand, the utilization of the video signal in itself ensures the perfect synchronization between the impressed commands and the recording phase of the TV-camera, and the presence of the coincidence detector 28 prevents possible noises from impairing the fidelity of the transfer of the commands.

Reverting to the diagram of FIG. 1, it has been said that the counter 29 has been stopped at a counting stage which corresponds to that of the counter 23 and thus to the particular presetting of the decoding circuit 24, and that the monostable multivibrators 31 and 31' have enabled the decoding circuit 32 so as to have it to transfer a command signal to a utilizing apparatus whose selection is just a function of the state of count of the counter 29. Whereas the decoding circuit 32 remains in the state it took even after the monostable multivibrator 31' has returned to its stable state, the counter 29 is brought back, conversely, to its original "at rest" state by a pulse delivered by the generator 33 (plot *t*, FIG. 2), as a result of a command imparted thereto by the monostable multivibrator 31' via the delay line 34 (a few microseconds).

The situation as described above holds good until the monostable multivibrator 17' has returned to its original stable state (plot *c*, FIG. 2). Should one of the pairs of switches contained in the pushbutton array 19' have been previously shifted away of its at rest position and thus in a position which involves the opening of the gate 18 and the presetting of the decoding circuit 24 to deliver a certain encoded command, the occurrence of such a return causes, in point of fact, in addition to disabling the decoding circuit 24 and the enabling of the decoding circuit 24', a new switching of the bistable multivibrator 20 to its stable state, which corresponds to an output level of "0" (plot *e*, FIG. 2) and thus the delivery, by the generator 25 (plot *n*, FIG. 2), of a pulse which restores the counter 23 to its initial at rest condition (and thus output of the decoding circuit 24 is brought back to "0") and ensures that the bistable multivibrator 10 is also in its initial stable state in which the conduction of the transistor 9 is provided, as well as the cutoff of the transistor 13 and the closure of the gate 22. The several component parts of the device are thus restored to the condition which allows the first line pulse delivered to the bistable multivibrator 20 to start a new counting cycle, such as described hereinbefore. In FIG. 2 (plot *m*), it has been assumed that the decoding circuit 24' has been preset for counting four line pulses, so that also the counter 29 will count four pulses and, through the decoding circuit 32' (enabled by the logical level "1" of both the monostable multivibrators 31 and 31') controls the beginning of a control signal towards a destination which is a function of the counted number. The counter 29 is then reset again by the pulse as delivered thereto at the beginning of the subsequent half-frame, by the pulse generator 33 (plot *t*, FIG. 2) under the control of the frame synchronism separator 30.

The device as shown in FIG. 1, can have a number of modifications which are within the scope of the invention. The simplest modification, for example, is an embodiment which provides for the addition of further monostable multivibrators, like 17 and 17', of further gates like 18 and 18', of further decoding circuits like 24 and 24', of further pushbutton arrays like 19 and 19', of further decoding circuits like 32 and 32' and of further monostable multivibrators like 31 and 31' to make possible the transfer of a larger number of commands within an interval between a group of frame pulse and the next.

Figure 5A:
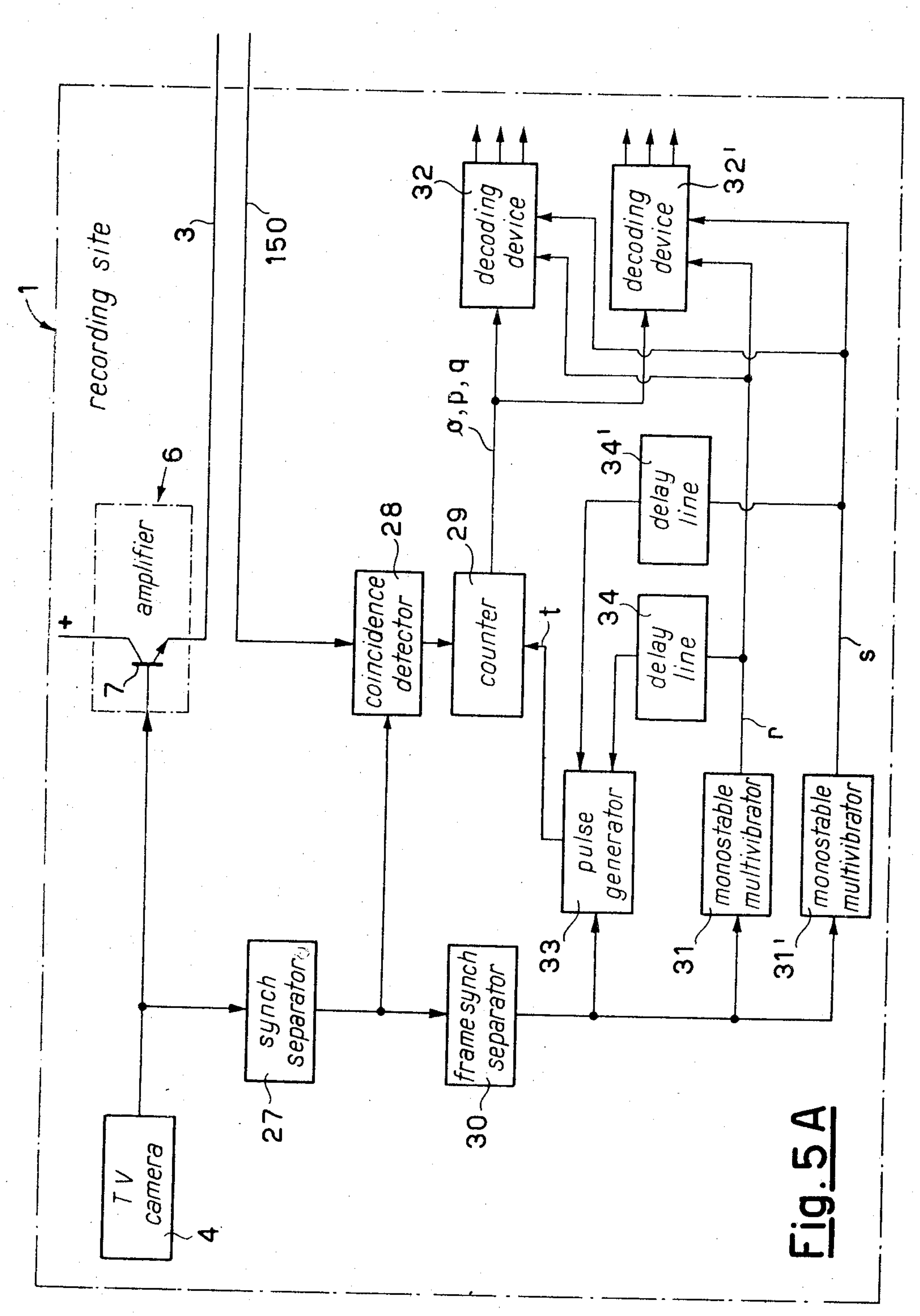
FIGS. 5A and 5B, which Figures are to be read together and considered hereinafter as FIG. 5, shows the block diagram of another device according to the invention, in which the selection of predetermined numbers of line synchronization pulses from the video signal transferred from the recording site to the control site and the communication thereof to the recording site are effected by taking said pulses in correspondence with the control site and conveying them towards the recording site on a line added to the cable which carries the video signal.
Figure 5B:
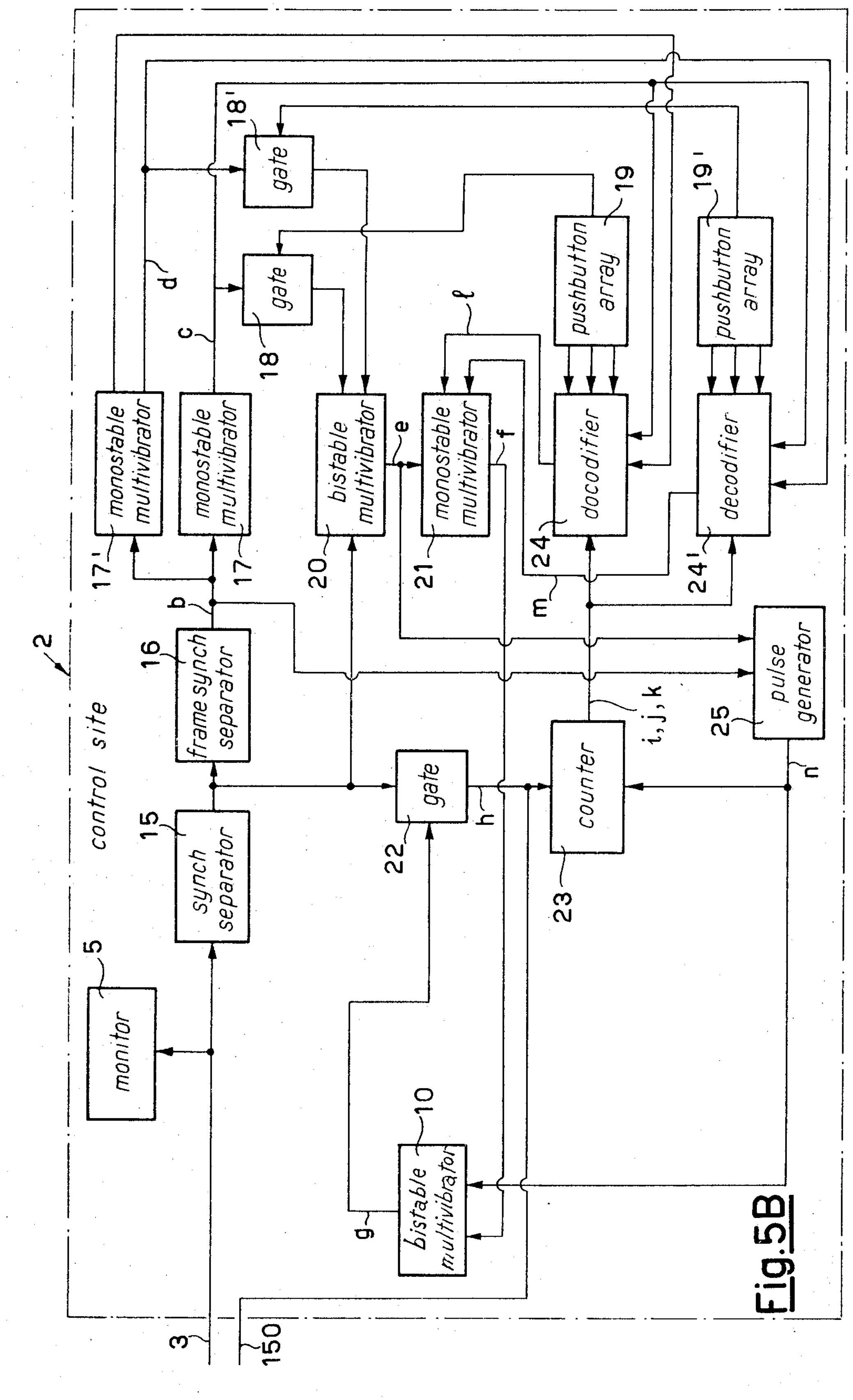

A more substantial modification, on the other hand, is that which provides for the conversion of the device of FIG. 1 into that of FIG. 5 (where the same reference numerals have been used for indicating the component parts which have been kept unaltered). As can be seen, the level depressor 11, the unmatching stage 39, the level restorer 12 and the level detector 26 have been dispensed with, whereas a direct connection has been made between the output of the gate 22 and the input of the coincidence detector 28, by means of a lead 150. In such a case, no lowering of the level of the transferred video signal is effected, but the commands, even though they are transferred along an ancilliary line, are anyhow synchronized with the video signal and encoded in such a way that their destinations (and possibly their magnitudes) be a function of the number of the transferred pulses. The operation of the device of FIG. 5 will not be described herein, inasmuch as it can easily, be inferred from that of FIG. 1.

What is claimed is:

1. In a method for the transfer of commands from a control site to a recording site in a closed loop TV installation of the type provided with a recording site which includes TV camera means actuated for generating a video signal including line-synchronizing pulses, a frame-synchronizing pulses and post-equalization pulses, and a control site including monitoring means and controlling means operable for delivering commands to the TV camera means, and wherein a cable interconnects the recording site and the control site so as to transfer the video signal from the recording site to the control site, the improvement comprising, for each command from the control site, lowering of the level of a predetermined number of the line-synchronizing pulses included in the video signal, said lowering being actuated by said controlling means at the control site and extending along the entire cable, and, at the recording site, detecting the lowered-level line-synchronizing pulses, and converting the counted number of lowered-level line-synchronizing pulses into a signal whose magnitude and destination are determined by and are a function of said counted number.

2. A method according to claim 1, characterized in that it comprises, at the control site, bringing the lowered-level line-synchronizing pulses back to the original level before they reach the monitoring means.

3. A method according to claim 2, characterized in that it comprises maintaining the start of each level lowering in a preselected time relationship with the frame-synchronizing pulses preceding said start.

4. A method according to claim 3, characterized in that it comprises selecting said time relationship so that the start of the first level lowering which follows each group of frame-synchronizing pulses is delayed after the post-equalization pulses.

5. A method according to claim 4, characterized in that it comprises selecting said time relationship so that the start of each level lowering falls within an interval between two consecutive line-synchronizing pulses.

6. A method according to claim 5, characterized in that it comprises comparing the number of the lowered-level line-synchronizing pulses and a predetermined variable number and producing the end of the level lowering when said numbers are equal.

7. A method according to claim 6, characterized in that it comprises checking the coincidence between the lowered-level pulses and the line-synchronizing pulses comprised in the video signal emerging from the TV camera means before counting the lowered-level pulses at the recording site.

8. An apparatus for the transfer of commands from a control site to a recording site in a closed loop TV installation of the type provided with a recording site including TV camera means actuated for generating a video signal including line-synchronizing pulses, frame-synchronizing pulses and post-equalization pulses, a control site including monitoring means and controlling means operable for delivering commands to the TV camera means, and a cable which interconnects said recording site and said control site so as to transfer the video signal from the recording site to the control site, said apparatus comprising, at the control site, means actuated by each command from the controlling means for lowering along the entire cable the level of a predetermined number of the line-synchronizing pulses included in the video signal and, at the recording site, means for detecting the lowered-level line-synchronizing pulses; means for counting all the detected lowered-level line-synchronizing pulses, and means for converting the counted number of lowered-level line-synchronizing pulses into a signal whose magnitude and destination are determined by and are a function of said counted number.

9. An apparatus according to claim 8, characterized in that it comprises level-restoring means inserted between said level-lowering means and the monitoring means for bringing the lowered-level line-synchronizing pulses to the original level, and an unmatching stage inserted between said level-lowering means and said level-restoring means.

10. An apparatus according to claim 9 characterized in that it comprises; downstream of said level-restoring means and in parallel with respect to the monitoring means; a first synchronism separator; a first amplifying integrator connected to deliver elongate pulses each of which is started with the first, and is terminated by the last frame synchronizing pulse comprised in each half-frame interval of the signal at the output of each first synchronism separator; at least a first monostable multivibrator which is driven by each of said elongate pulses away of its stable state, a multivibrator having at least one stable state which is driven by the return of said first monostable multivibrator to its stable state away of said first stable state and is driven by said first synchronism separator so that the first synchronizing pulse delivered after said drive away causes the return thereof to the first stable state; a second monostable multivibrator which is driven by the return of said multivibrator having at least one stable state to said first stable state momentarily away of its stable state; a first bistable multivibrator for controlling said level lowering means and said level restoring means which are driven, every time that said second monostable multivibrator returns to its stable state, to be switched between a first stable state, to which correspond the deactuation of said level lowering means and said level restoring means and the closure of a gate inserted between said first synchronism separator and a first digital counter, and a second stable state to which corresponds the simultaneous actuation of said level lowering means and the opening of said gate; and at least a first decoding circuit which compares the number counted by said first counter with a predetermined number corresponding to a variable presetting thereof and drives the momentary shift of said second monostable multivibrator from its stable state when said numbers are equal.

11. An apparatus according to claim 10, characterized in that it comprises a first pulse generator which is driven at every shifting cycle of said multivibrator having at least one stable state, to generate a resetting pulse for said first counter.

12. An apparatus according to claim 11, characterized in that said multivibrator having at least one stable state is a bistable multivibrator.

13. An apparatus according to claim 11, characterized in that said multivibrator having at least one stable state is a monostable multivibrator whose constant of oscillation is at least equal to the period of repetition of the line synchronizing pulses.

14. An apparatus according to claim 13, characterized in that there is arranged, in parallel with said monostable multivibrator, at least another monostable multivibrator having a greater constant of oscillation and that, in parallel with said first decoding circuit there is arranged at least another decoding circuit which is enabled to replace the first decoding circuit as said other monostable multivibrator returns to its stable state.

15. An apparatus according to claim 14, characterized in that said first monostable multivibrator has a constant of oscillation which is such as to delay the return of the multivibrator to its stable state beyond the group of the post-equalization pulses.

16. An apparatus according to claim 15, characterized in that said second monostable multivibrator has a constant of oscillation equal to a fraction of the period of repetition of the line synchronizing pulses.

17. An apparatus according to claim 16, characterized in that it comprises, in association with the recording site, a level detector, a second digital counter and at least a second decoding circuit having a plurality of outputs which are energized alternatingly as a function of the number of the line synchronizing pulses as detected by the level detector and counted by said counter.

18. An apparatus according to claim 17, characterized in that there is inserted between said level detector and said second counter, a coincidence detector which is connected for delivering a pulse whenever a coincidence occurs between a pulse detected by the level detector and one of the line synchronizing pulses sent thereto by a second synchronism separator connected in parallel at the TV-camera output.

19. An apparatus according to claim 18, characterized in that it comprises a second pulse generator which is driven by a second amplifying integrator fed by said second synchronism separator, to deliver a resetting pulse for said second counter at every group of frame-synchronizing pulses which is comprised by the video signal.

20. An apparatus according to claim 19, characterized in that said second decoding circuit is supplemented by at least another decoding circuit which can be substituted for said second decoding circuit.

21. An apparatus according to claim 20, characterized in that said second decoding circuit and the decoding circuit added thereto are actuated alternatingly under the control of a third and a fourth monostable multivibrator whose respective constants of oscillation are slightly lower than those of said first monostable multivibrator and said other monostable multivibrator added thereto, said third and said fourth multivibrators being driven to shift away of their respective stable states by said second amplifying integrator and driving in turn, via respective delay lines, the actuation of said second pulse generator.

* * * * *

UNITED STATES PATENT OFFICE
CERTIFICATE OF CORRECTION

Patent No. 3,752,907 Dated August 14, 1973

Inventor(s) Lamberto Mazza

It is certified that error appears in the above-identified patent and that said Letters Patent are hereby corrected as shown below:

[30] Foreign Priority Data

Italy 22276 A/70 filed March 21, 1970.

Signed and sealed this 23rd day of April 1974.

(SEAL)
Attest:

EDWARD M.FLETCHER,JR.
Attesting Officer

C. MARSHALL DANN
Commissioner of Patents